United States Patent [19]
Hou

[11] Patent Number: 5,845,626
[45] Date of Patent: Dec. 8, 1998

[54] AIR INLET AUXILIARY DEVICE FOR VEHICLES

[76] Inventor: Fu Li Hou, 8F-3 No. 181, Ting-Hua Rd., San-Min District, Kaohsiung, Taiwan

[21] Appl. No.: 831,691

[22] Filed: Apr. 10, 1997

[51] Int. Cl.⁶ .................................................. F02B 23/00
[52] U.S. Cl. .......................................... 123/585; 123/587
[58] Field of Search ..................................... 123/585, 587

[56] References Cited

U.S. PATENT DOCUMENTS

| | | | |
|---|---|---|---|
| 4,715,351 | 12/1987 | Pankow | 123/587 |
| 4,852,539 | 8/1989 | Pankow | 123/587 |
| 5,738,078 | 4/1998 | Chen | 123/587 |

Primary Examiner—John T. Kwon
Attorney, Agent, or Firm—Bacon & Thomas

[57] ABSTRACT

An air inlet auxiliary device provides additional air to an inlet manifold of a vehicle. The auxiliary device includes a main body, a filter assembly mounted to a first end of the main body, a control seat mounted to a second end of the main body and in fluid communication with the inlet manifold, and first and second cylindrical members mounted in the main body. Air passages are defined in the first and second cylindrical members. When the engine of the vehicle is idling or runs under a speed slower than a pre-determined value, more additional air is supplied to the air manifold, and when the engine is running under a speed faster than the pre-determined value, only a small additional amount of air is supplied to the inlet manifold.

6 Claims, 4 Drawing Sheets

AIR INLET AUXILIARY DEVICE FOR VEHICLES

FIELD OF THE INVENTION

The present invention relates to an air inlet auxiliary device for vehicles and, more particularly, to an improved device which may supply an additional amount of air when the engine is idling or operates at a mediate speed to save fuel.

DESCRIPTION OF THE RELATED ART

A typical air inlet auxiliary device for vehicles generally supplies additional air of a fixed amount when the engine is idling or operates at a mediate speed to save fuel. However, when the throttle fully opens, a vacuum phenomenon in the manifold is enhanced while the fixed amount of auxiliary inlet air cannot fulfill the need such that the pressure inside the air inlet auxiliary device resulting from the vacuum phenomenon increases suddenly. Thus, a pressure gauge of the air inlet auxiliary device will be damaged and the auxiliary air cannot be of any help. The present invention is intended to provide an improved air inlet auxiliary device which mitigates and/or obviates the above problems.

SUMMARY OF THE INVENTION

An air auxiliary device for vehicles in accordance with the present invention comprises a main body including a first hole defined in a first end thereof and a second hole defined in a second end thereof. The main body further includes a first receiving compartment extending in a direction transverse to a longitudinal direction of the main body, an upper path and a lower path being defined in the main body for intercommunicating the first receiving compartment with the first hole of the main body. A second receiving compartment is defined in the main body and extends in a direction transverse to the longitudinal direction of the main body. A connecting path is defined in the main body between the first receiving compartment and the second receiving compartment. The main body further includes a main air path defined therein and extending along the longitudinal direction thereof, the main air path being in fluid communication with the first receiving compartment and the second receiving compartment. The main body further includes an air outlet passage defined therein for intercommunicating the main air path with the second hole of the main body.

A filter assembly is mounted in the first hole of the main body for filtering air and has an air output in fluid communication with the upper path and the lower path. A first cylindrical member is received in the first receiving compartment and has an inner path defined therein for intercommunicating the lower path with the main air path. The first cylindrical member further includes an annular groove defined in an outer periphery thereof and in fluid communication with the upper path.

Received in the second receiving compartment is a second cylindrical member which comprises an air passage defined therein for intercommunicating the annular groove of the first cylindrical member with the main air path. A check valve is mounted in the air passage such that air is only flowable from the annular groove of the first cylindrical member to the main air path.

A control seat is mounted to the second end of the main body and includes a longitudinal bore extending therethrough and in fluid communication with the air outlet passage. The control seat further includes a transverse hole having a first end in fluid communication with the longitudinal bore and a second end in fluid communication with an inlet manifold. A guiding sleeve is mounted in the control seat and includes a central passage extending therethrough for intercommunicating the air outlet passage with the transverse hole. The guiding sleeve further includes a plurality of recesses defined in an outer periphery for intercommunicating the air outlet passage with the transverse hole. A blocking element is mounted in the control seat between the air outlet passage and the guiding sleeve. A biasing means is provided biasing the blocking element toward the air outlet passage. In an embodiment of the invention, the biasing means in the control seat includes a first spring mounted between the enlarged end of the adjusting bolt and the guiding sleeve and a second spring mounted between the enlarged end of the adjusting bolt and the blocking element.

When an engine of an vehicle to which the air inlet auxiliary device is mounted runs under a speed slower than a first pre-determined speed, the check valve in the second cylindrical member is closed so that no air is flowable from the annular groove of the first cylindrical member to the main air path, and the central passage of the guiding sleeve is not blocked by the blocking element such that air from the air outlet of the filter assembly flows to the inlet manifold via the lower path, the inner path of the first cylindrical member, the main air path, the air outlet passage, the central passage and the recesses of the guiding sleeve, and the transverse hole.

When the engine runs at a speed faster than the first pre-determined speed yet slower than a second pre-determined speed, the check valve in the second cylindrical member is open so that air is flowable from the annular groove of the first cylindrical member to the main air path, and the central passage of the guiding sleeve is not blocked by the blocking element such that air from the air outlet of the filter assembly flows to the main air path via the lower path and the inner path of the first cylindrical member and also via the upper path, the annular groove of the first cylindrical member, and the air passage of the second cylindrical member, the air in the main air path then flows to the inlet manifold via the air outlet passage, the central passage and the recesses of the guiding sleeve, and the transverse hole.

When the engine runs under a speed faster than the second pre-determined speed, the check valve in the second cylindrical member is closed so that no air is flowable from the annular groove of the first cylindrical member to the main air path, and the central passage of the guiding sleeve is blocked by the blocking element such that air from the air outlet of the filter assembly flows to the inlet manifold via the lower path, the inner path of the first cylindrical member, the main air path, the air outlet passage, the recesses of the guiding sleeve, and the transverse hole.

A third receiving compartment in fluid communication with the main air path may be defined in the main body and extend in a direction transverse to the longitudinal direction of the main body. A pressure gauge is attached to the main body and in fluid communication with the third receiving compartment to indicate a pressure of the air in the main air path.

The filter assembly includes a container securely mounted to the first end of the main body, a filter mounted in the container, and a guiding member mounted in the first hole and having a stem portion which extends in the filter. The air outlet of the filter assembly is defined in the guiding member.

In an embodiment of the invention, the second cylindrical member includes a plurality of inlet openings defined in a periphery thereof for intercommunicating the annular groove with the air passage, and the check valve includes a spring-biased ball mounted in the air passage.

The control seat further includes a screw hole defined in an end thereof which is distal to the main body, and further includes an adjusting bolt having an enlarged end in the control seat and a threaded stem which extends beyond the screw hole of the control seat.

Other objects, advantages, and novel features of the invention will become more apparent from the following detailed description when taken in conjunction with the accompanying drawings.

DESCRIPTION OF THE PREFERRED EMBODIMENT

Figure 1:
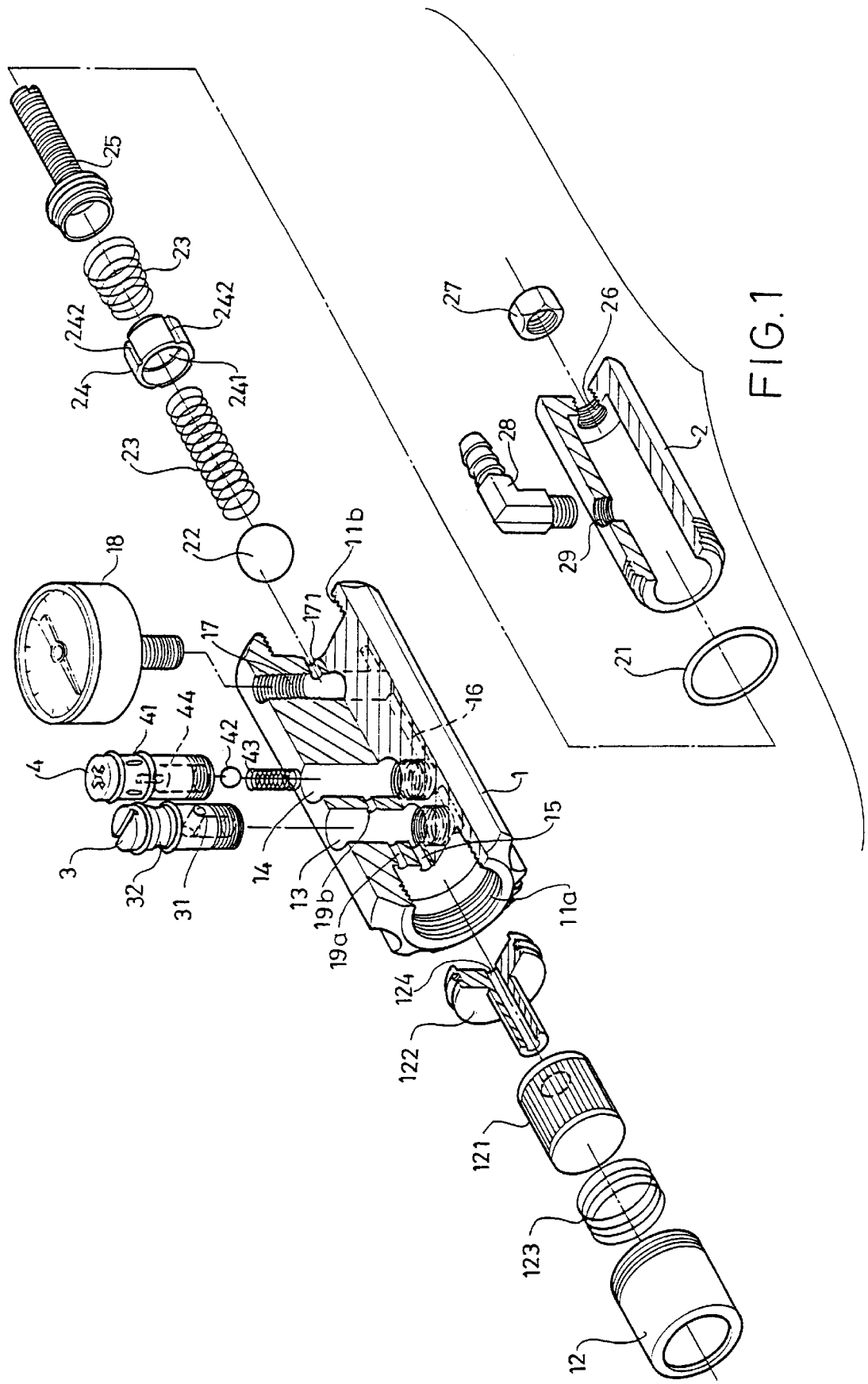
FIG. 1 is an exploded perspective view, partly cut away, of an air inlet auxiliary device in accordance with the present invention.
Figure 2:
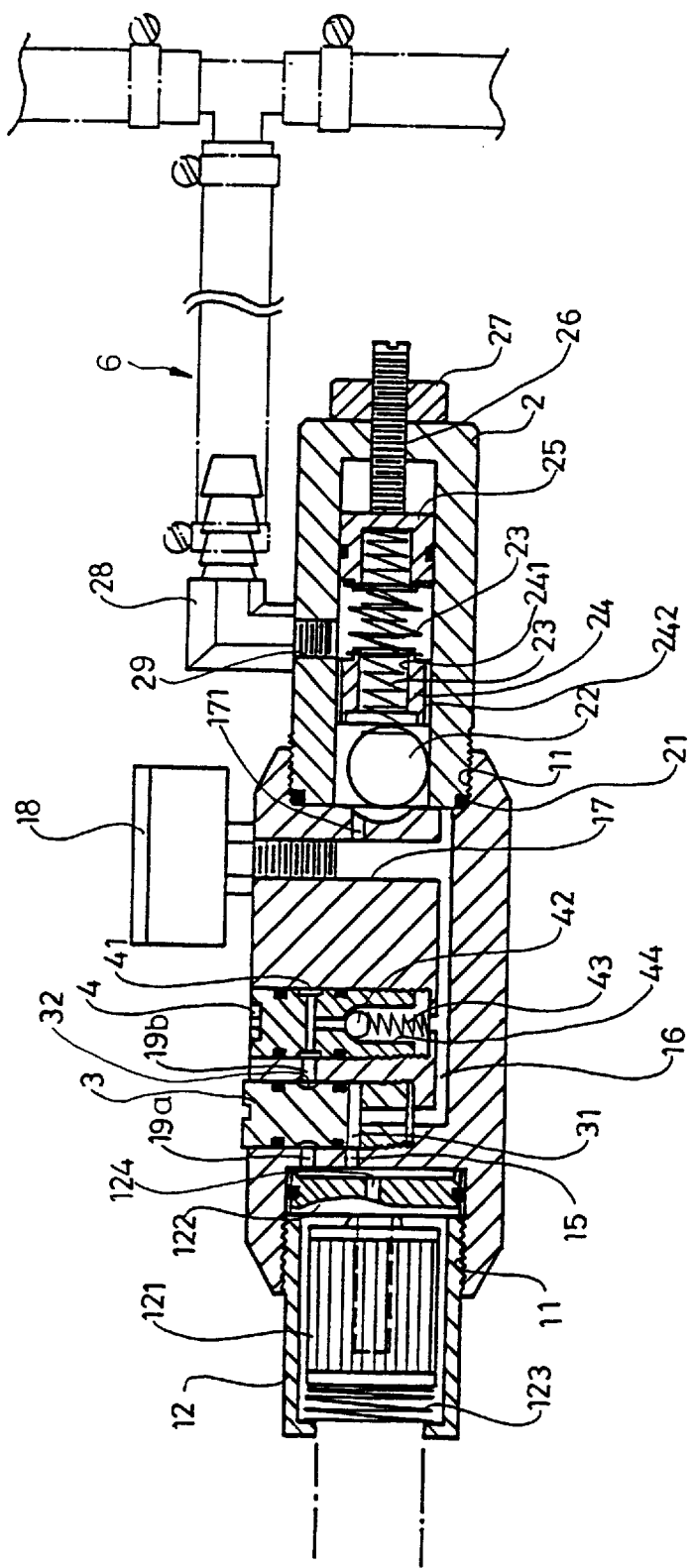
FIG. 2 is a sectional view of the air inlet auxiliary device in accordance with the present invention.

Referring to FIGS. 1 and 2, an air inlet auxiliary device for vehicles in accordance with the present invention generally includes a main body 1, a control seat 2, a first cylindrical member 3, and a second cylindrical member 4. The main body 1 includes a first threaded hole 11a defined in a first end thereof and a second threaded hole 11b defined in a second end thereof. A filter assembly is mounted in the first end of the main body 1 and the control seat 2 is mounted in the second end of the main body 1. The main body 1 further includes a main air path 16 defined therein and extending along a longitudinal direction thereof, which will be described later.

The filter assembly includes a container 12 having an outer threading defined in a first end thereof for threading engagement with the first threaded hole 11a. The container 12 includes a filter 121 mounted therein and a spring 123 is mounted between a second end of the container 12 and an end wall of the filter 121 to bias the filter, as shown in FIG. 2. A guiding member 122 is mounted in the first threaded hole 11a and has a stem portion which extends in the filter 121.

A first transverse receiving compartment 13 is defined in the main body 1 and extends in a direction transverse to the longitudinal direction of the main body 1. The first transverse receiving compartment 13 is in fluid communication with an air output 124 of the guiding seat 122 of the filter assembly via a first upper path 19a and a lower path 15. Mounted in the first transverse receiving compartment 13 is the first cylindrical member 3 which includes an inner path 31 having an upper end in fluid communication with the lower path 15 and a lower end in fluid communication with the main air path 16. The first cylindrical member 3 further includes an annular groove 32 defined in an outer periphery thereof and in fluid communication with the upper path 19a.

The second cylindrical member 4 is received in a second transverse receiving compartment 14 which is also defined in the main body 1 and extends in a direction transverse to the longitudinal direction of the main body 1. The second cylindrical member 4 includes a plurality of inlet openings 41 defined in a periphery thereof and in fluid communication with the annular groove 32 of the first cylindrical member 3 via a connecting path 19b. The second cylindrical member 4 further includes an air passage 44 defined therein which has an upper end in fluid communication with the inlet openings 41 and a lower end in fluid communication with the main air path 16. In addition, a check valve is mounted in the air passage 44 such that air is only flowable from the inlet openings 41 to the main air path 16. The check valve includes a ball 42 and a spring 43 for biasing the ball 42 upwardly to normally block the air passage 44.

A pressure gauge 18 is attached to the main body 1 and in fluid communication with a third receiving compartment 17 which is defined in the main body 1 and in fluid communication with the main air passage 16 to show the pressure of air inside the main air passage 16. In addition, an air outlet passage 171 is defined in the main body 1 for intercommunicating the main air passage 16 with the second threaded hole 11b.

The control seat 2 has a longitudinal bore extending therethrough and in fluid communication with the air outlet passage 171. The control seat 2 further includes a first end in threading engagement with the second threaded hole 11b of the main body 1 and a second end having a screw hole 26 defined therein. An air tight ring 21 is used to provide an air tight effect, as shown in FIG. 2. A blocking element 22, an elastic means 23, a guiding sleeve 24, and an adjusting bolt 25 is mounted in the longitudinal bore of the control seat 2. The adjusting bolt 25 includes an enlarged head located in the control seat 2 and a threaded stem which extends through the screw hole 26 of the control seat 2 and which has a distal end thereof extending beyond the control seat 2 for manual operation. In addition, a nut 27 is mounted to the threaded stem of the adjusting bolt 25 to position the adjusting bolt 25 after adjustment is finished.

The blocking element 22 may be a ball and be biased by the elastic means 23 toward the air outlet passage 171. In this embodiment, the elastic means 23 may include two springs in which one spring is mounted between the enlarged head of the adjusting bolt 25 and the guiding sleeve 24, while the other spring is mounted between the enlarged head of the adjusting bolt 25 and the blocking element 22. The control seat 2 further includes a transverse hole 29 having a first end in fluid communication with the longitudinal bore of the control seat and a second end in fluid communication with an inlet manifold 6 via an inlet tube 28. Acceleration of the engine may result in a suction force which may urge the blocking element 22 to move away from the air outlet passage 171. If the suction force is small, air may flow into the inlet tube 28 via a plurality of recesses 242 defined in an outer periphery of the guiding sleeve 24 and a central passage 241 defined in the guiding sleeve 24. If the suction force is relatively large, the central passage 241 of the guiding sleeve 24 is blocked such that air may flow only from the air outlet passage 171 to the inlet tube 28 via the recesses 242 defined in the outer periphery of the guiding sleeve 24.

Still referring to FIGS. 1 and 2, when the engine runs idle or under at a low speed slower than a pre-determined speed, the air passes through the filter 121, the air output 124, the lower path 15, the inner path 31 of the first cylindrical member 3, the main air path 16 of the main body 1, the air outlet passage 171, the central passage 241 and the recesses 242 of the guiding sleeve 24, and the inlet tube 28, and finally enters the inlet manifold 6, thereby supplying additional air into the inlet manifold 6 to save fuel.

Figure 3:
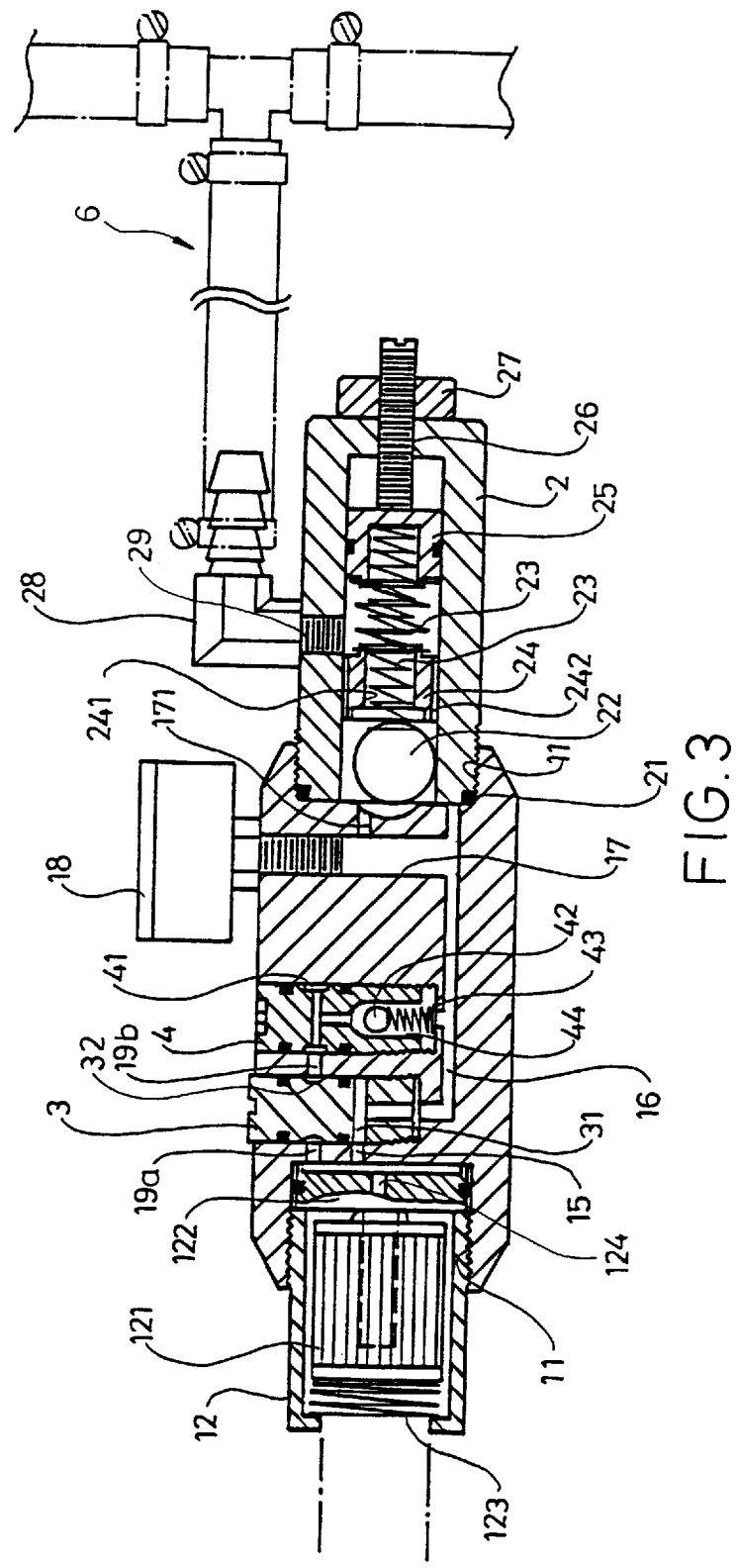
FIG. 3 is a view similar to FIG. 2, illustrating operation of the air inlet auxiliary device under mediate engine speed.
Figure 4:
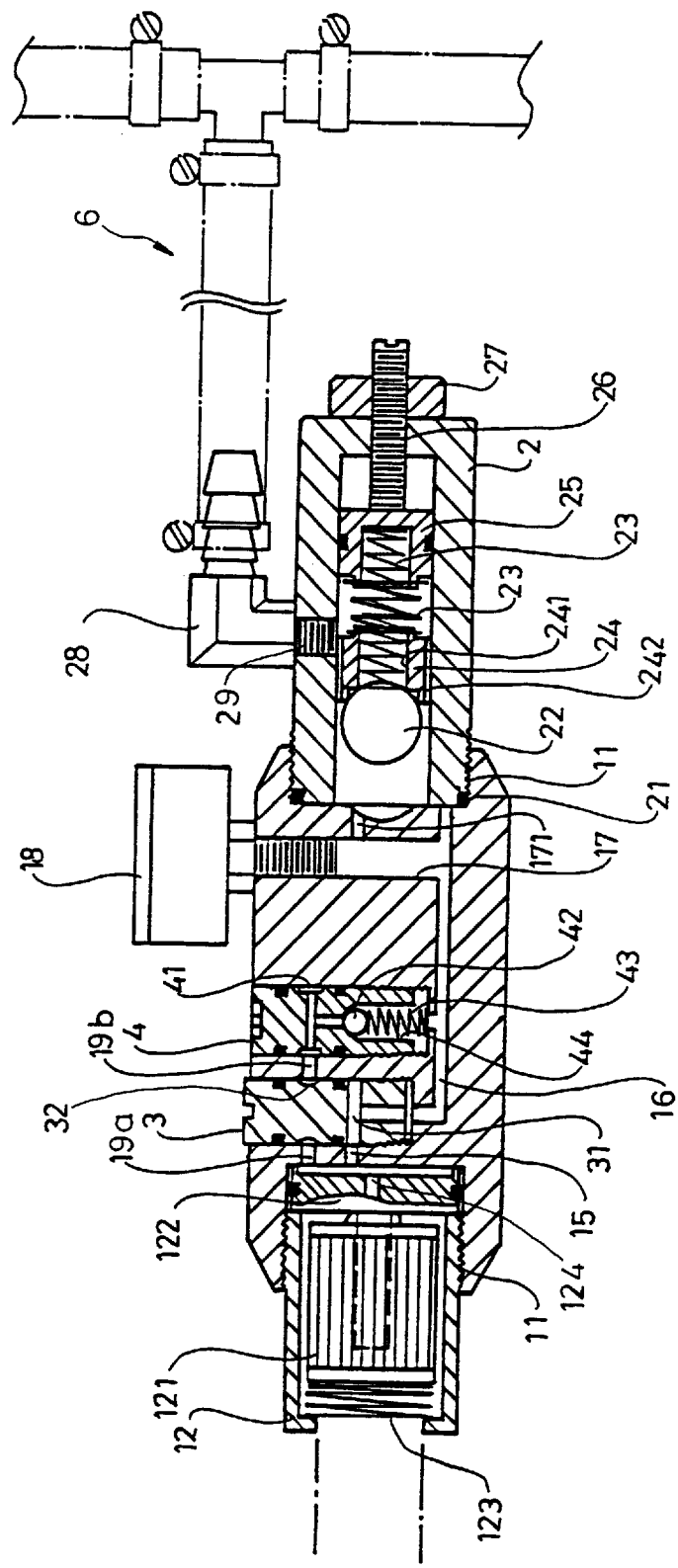
FIG. 4 is a view similar to FIG. 2, illustrating operation of the air inlet auxiliary device under high engine speed.

Referring to FIG. 3, when the engine runs under a mediate speed (i.e., faster than the low speed yet still slower than the pre-determined speed), the ball 42 of the check valve in the second cylindrical member 4 is moved downwardly due to a suction force resulting from acceleration of the engine. In addition to the air supplied via the route mentioned in the above paragraph, further additional air is supplied to the inlet manifold 6 via the upper path 19*a*, the groove 32 of the first cylindrical member 3, the connecting path 19*b*, the inlet openings 41, the passage 44, the main air path 16 of the main body 1, the air outlet passage 171, the central passage 241 and the recesses 242 of the guiding sleeve 24, and the inlet tube 28.

When the engine runs under a high speed faster than the pre-determined speed, the resultant suction force is relatively large to urge the blocking element 22 to block the central passage 241 of the guiding sleeve 24, while the check valve in the second cylindrical member 4 is closed. Thus, only a small amount of additional air is supplied to the inlet manifold 6 via the lower path 15, the inner path 31, the main air path 16 of the main body 1, the air outlet passage 171, the recesses 242 of the guiding sleeve 24, and the inlet tube 28. Accordingly, the outputted power is increased.

Accordingly, the air inlet auxiliary device for vehicles of the present invention may save fuel when the engine is idling or runs at either a low speed or a mediate speed. And when the engine runs at a high speed, the blocking element 22 blocks the larger path, i.e., the central passage 241 of the guiding sleeve 24 to reduce the amount of air supplied additionally, thereby protecting the pressure gauge 18 from being damaged.

Although the invention has been explained in relation to its preferred embodiment, it is to be understood that many other possible modifications and variations can be made without departing from the spirit and scope of the invention as hereinafter claimed.

What is claimed is:

1. An air auxiliary device for vehicles, comprising:

a main body including a first hole defined in a first end thereof and a second hole defined in a second end thereof, the main body further including a first receiving compartment extending in a direction transverse to a longitudinal direction of the main body, an upper path and a lower path being defined in the main body for intercommunicating the first receiving compartment with the first hole of the main body, a second receiving compartment being defined in the main body and extending in a direction transverse to the longitudinal direction of the main body, a connecting path being defined in the main body between the first receiving compartment and the second receiving compartment, the main body further including a main air path defined therein and extending along the longitudinal direction thereof, the main air path being in fluid communication with the first receiving compartment and the second receiving compartment, and the main body further including an air outlet passage defined therein for intercommunicating the main air path with the second hole of the main body;

a filter assembly mounted in the first hole of the main body for filtering air and having an air output in fluid communication with the upper path and the lower path;

a first cylindrical member received in the first receiving compartment and having an inner path defined therein for intercommunicating the lower path with the main air path, the first cylindrical member further including an annular groove defined in an outer periphery thereof and in fluid communication with the upper path;

a second cylindrical member received in the second receiving compartment, the second cylindrical member comprising an air passage defined therein for intercommunicating the annular groove of the first cylindrical member with the main air path, a check valve being mounted in the air passage such that air is only flowable from the annular groove of the first cylindrical member to the main air path; and a control seat mounted to the second end of the main body, the control seat including a longitudinal bore extending therethrough and in fluid communication with the air outlet passage, the control seat further including a transverse hole having a first end in fluid communication with the longitudinal bore and a second end adapted to be in fluid communication with an inlet manifold, a guiding sleeve being mounted in the control seat and including a central passage extending therethrough for intercommunicating the air outlet passage with the transverse hole, the guiding sleeve further including a plurality of recesses defined in an outer periphery for intercommunicating the air outlet passage with the transverse hole, a blocking element being mounted in the control seat between the air outlet passage and the guiding sleeve, and means for biasing the blocking element toward the air outlet passage;

whereby when an engine of an vehicle to which the air inlet auxiliary device is mounted runs under a speed slower than a first pre-determined speed, the check valve in the second cylindrical member is closed so that no air is flowable from the annular groove of the first cylindrical member to the main air path, and the central passage of the guiding sleeve is not blocked by the blocking element such that air from the air outlet of the filter assembly flows to the inlet manifold via the lower path, the inner path of the first cylindrical member, the main air path, the air outlet passage, the central passage and the recesses of the guiding sleeve, and the transverse hole;

when the engine runs at a speed faster than the first pre-determined speed yet slower than a second pre-determined speed, the check valve in the second cylindrical member is open so that air is flowable from the annular groove of the first cylindrical member to the main air path, and the central passage of the guiding sleeve is not blocked by the blocking element such that air from the air outlet of the filter assembly flows to the main air path via the lower path and the inner path of the first cylindrical member and also via the upper path, the annular groove of the first cylindrical member, and the air passage of the second cylindrical member, the air in the main air path then flows to the inlet manifold via the air outlet passage, the central passage and the recesses of the guiding sleeve, and the transverse hole; and when the engine runs under a speed faster than the second pre-determined speed, the check valve in the second cylindrical member is closed so that no air is flowable from the annular groove of the first cylindrical member to the main air path, and the central passage of the guiding sleeve is blocked by the blocking element such that air from the air outlet of the filter assembly flows to the inlet manifold via the lower path, the inner path of the first cylindrical member, the main air path, the air outlet passage, the recesses of the guiding sleeve, and the transverse hole.

2. The air inlet auxiliary device according to claim 1, further comprising a third receiving compartment defined in the main body and extending in a direction transverse to the longitudinal direction of the main body, the third receiving compartment being in fluid communication with the main air path, and a pressure gauge being attached to the main body and in fluid communication with the third receiving compartment to indicate a pressure of the air in the main air path.

3. The air inlet auxiliary device according to claim 1, wherein the filter assembly includes a container securely mounted to the first end of the main body, a filter mounted in the container, and a guiding member mounted in the first hole and having a stem portion which extends in the filter, and the air outlet is defined in the guiding member.

4. The air inlet auxiliary device according to claim 1, wherein the second cylindrical member includes a plurality of inlet openings defined in a periphery thereof for intercommunicating the annular groove with the air passage, and the check valve includes a spring-biased ball mounted in the air passage.

5. The air inlet auxiliary device according to claim 1, wherein the control seat further includes a screw hole defined in an end thereof which is distal to the main body, and further includes an adjusting bolt having an enlarged end in the control seat and a threaded stem which extends beyond the screw hole of the control seat.

6. The air inlet auxiliary device according to claim 5, wherein the biasing means in the control seat includes a first spring mounted between the enlarged end of the adjusting bolt and the guiding sleeve and a second spring mounted between the enlarged end of the adjusting bolt and the blocking element.

* * * * *